US010831149B2

(12) United States Patent
Yokoi et al.

(10) Patent No.: US 10,831,149 B2
(45) Date of Patent: *Nov. 10, 2020

(54) IMAGE FORMING APPARATUS HAVING MOUNTABLE AND DEMOUNTABLE PHOTOSENSITIVE MEMBER CARTRIDGE AND DEVELOPING CARTRIDGE

(71) Applicant: BROTHER KOGYO KABUSHIKI KAISHA, Nagoya (JP)

(72) Inventors: Junichi Yokoi, Nagoya (JP); Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/732,388

(22) Filed: Jan. 2, 2020

(65) Prior Publication Data

US 2020/0142350 A1 May 7, 2020

Related U.S. Application Data

(63) Continuation of application No. 16/181,493, filed on Nov. 6, 2018, now Pat. No. 10,551,791, which is a (Continued)

(30) Foreign Application Priority Data

Mar. 31, 2014 (JP) ................................ 2014-074861
Mar. 31, 2014 (JP) ................................ 2014-074862

(51) Int. Cl.

| | |
|---|---|
| ***G03B 21/16*** | (2006.01) |
| ***G03G 21/18*** | (2006.01) |
| ***G03G 21/16*** | (2006.01) |

(52) U.S. Cl.

CPC ..... *G03G 21/1661* (2013.01); *G03G 21/1647* (2013.01); *G03G 21/1676* (2013.01); *G03G 21/1821* (2013.01)

(58) Field of Classification Search

CPC ........... G03G 21/1661; G03G 21/1676; G03G 21/1831; G03G 21/1647

See application file for complete search history.

(56) References Cited

U.S. PATENT DOCUMENTS 8,559,850 B2 10/2013 Ishikawa et al.
9,256,196 B2 * 2/2016 Sato ....................... G03G 21/18

(Continued)

FOREIGN PATENT DOCUMENTS

EP 1 768 004 A2 3/2007
JP 62-050844 A 5/1987

(Continued)

OTHER PUBLICATIONS

Office Action issued in related Chinese Application No. 201510139809.7, dated Jan. 3, 2018.

*Primary Examiner* — Susan S Lee
(74) *Attorney, Agent, or Firm* — Merchant & Gould P.C.

(57) ABSTRACT

An image forming apparatus has a main body including a front wall and a rear wall. A side frame is disposed in the main body and has a photosensitive member cartridge guide and a developing cartridge guide. A sheet feeding tray is disposed in the main body. A photosensitive member cartridge includes a photosensitive drum and a developing cartridge has a developing roller. An exposing unit is configured to emit light toward the photosensitive drum to expose the photosensitive drum. A fixing device has a heating roller and a pressing roller. When the photosensitive member cartridge is at the photosensitive member cartridge mounting position, the photosensitive member cartridge is disposed at a position between the fixing device and the (Continued)

sheet feeding tray. When the developing cartridge is at the developing cartridge mounting position, the developing member is disposed at a position between the photosensitive member cartridge and the sheet feeding tray.

6 Claims, 10 Drawing Sheets

Related U.S. Application Data continuation of application No. 15/686,225, filed on Aug. 25, 2017, now Pat. No. 10,152,019, which is a continuation of application No. 15/193,384, filed on Jun. 27, 2016, now Pat. No. 9,746,825, which is a continuation of application No. 14/664,530, filed on Mar. 20, 2015, now Pat. No. 9,377,751.

(56) References Cited

U.S. PATENT DOCUMENTS

| | | | |
|---|---|---|---|
| 9,304,482 | B2 | 4/2016 | Kato |
| 2002/0181969 | A1 | 12/2002 | Terada et al. |
| 2005/0265748 | A1 | 12/2005 | Noh |
| 2005/0276629 | A1 | 12/2005 | Ahn et al. |
| 2006/0133850 | A1 | 6/2006 | Nishimura |
| 2006/0159486 | A1 | 7/2006 | Kweon |
| 2006/0275052 | A1 | 12/2006 | Ishikawa |
| 2008/0025756 | A1 | 1/2008 | Ahn et al. |
| 2008/0199204 | A1 | 8/2008 | Ishii et al. |
| 2008/0212993 | A1 | 9/2008 | Ishii et al. |
| 2009/0052940 | A1 | 2/2009 | Mizuno et al. |
| 2009/0180802 | A1 | 7/2009 | Sato et al. |
| 2011/0026968 | A1 | 2/2011 | Ishii et al. |
| 2011/0211864 | A1 | 9/2011 | Ishikawa |
| 2012/0070185 | A1 | 3/2012 | Yokota |
| 2012/0321342 | A1 | 12/2012 | Mori |
| 2013/0164030 | A1 | 6/2013 | Anan et al. |
| 2013/0164032 | A1 | 6/2013 | Sato et al. |
| 2015/0261173 | A1 | 9/2015 | Sato |

FOREIGN PATENT DOCUMENTS

| | | | | | |
|---|---|---|---|---|---|
| JP | 64-015758 | A | | 1/1989 | |
| JP | H4-90561 | A | | 3/1992 | |
| JP | 8-020843 | B2 | | 3/1996 | |
| JP | 2005-070261 | A | | 3/2005 | |
| JP | 2006-106020 | A | | 4/2006 | |
| JP | 2007-286127 | A | | 11/2007 | |
| JP | 2008-185737 | A | | 8/2008 | |
| JP | 2008-203566 | A | | 9/2008 | |
| JP | 2009-048138 | A | | 3/2009 | |
| JP | 2010-224483 | A | | 10/2010 | |
| JP | 2013-3191 | A | | 1/2013 | |
| JP | 2014016492 | A | * | 1/2014 | ......... G03G 21/1821 |
| JP | 2015-145946 | A | | 8/2015 | |
| JP | 2015175934 | A | * | 10/2015 | ......... G03G 21/1676 |

* cited by examiner

IMAGE FORMING APPARATUS HAVING MOUNTABLE AND DEMOUNTABLE PHOTOSENSITIVE MEMBER CARTRIDGE AND DEVELOPING CARTRIDGE

CROSS-REFERENCE TO RELATED APPLICATION

This application is a continuation of U.S. patent application Ser. No. 16/181,493, filed Nov. 6, 2018, which is a continuation of U.S. patent application Ser. No. 15/686,225, filed Aug. 25, 2017, now U.S. Pat. No. 10,152,019. which is a continuation of U.S. patent application Ser. No. 15/193,384, filed Jun. 27, 2016, now U.S. Pat. No. 9,746,825, which is a continuation of U.S. patent application Ser. No. 14/664,530, filed Mar. 20, 2015, now U.S. Pat. No. 9,377,751, which claims priorities from Japanese Patent Application No. 2014-074861 filed on Mar. 31, 2014 and from Japanese Patent Application No. 2014-074862 filed on Mar. 31, 2014, the entire disclosures of which are incorporated herein by reference.

TECHNICAL FIELD

The present disclosure relates to an image forming apparatus including a photosensitive member cartridge having a photosensitive member and configured to be detachable from an apparatus main body, and a waste developer container configured to accommodate therein developer collected from the photosensitive member.

The present disclosure relates to an image forming apparatus, and more particularly, to improvements on a mechanism configured to press a developing roller to a photosensitive drum.

BACKGROUND

In the related art, an image forming apparatus has been known which includes a photosensitive member cartridge having a photosensitive member, a waste developer container configured to accommodate therein developer collected from the photosensitive member, and an exposing unit arranged in front of the photosensitive member cartridge and configured to expose the photosensitive member (see, for example, JP-A-2005-070261). In this image forming apparatus, the photosensitive member cartridge is configured to be mounted and demounted from above an apparatus main body, and the waste developer container is configured integrally with the photosensitive member cartridge and is arranged above the photosensitive member.

Regarding a configuration where the photosensitive member cartridge is to be mounted and demounted through below the exposing unit, according to the configuration disclosed in JP-A-2005-070261, since the waste developer container is arranged above the photosensitive member, the waste developer container may interfere with the exposing unit when mounting and demounting the photosensitive member cartridge.

In the related art, another type of image forming apparatus has been known in which a front cover is provided with an urging member so as to press a developing roller to a photosensitive drum and the urging member pushes a developing cartridge to press the developing roller to the photosensitive drum when the front cover is closed (see, for example, JP-A-2006-106020).

However, in this image forming apparatus, since the front cover is applied with a reactive force of the urging member, it is necessary to increase the stiffness of the front cover. Also, the front cover is difficult to be closed and is likely to be unnecessarily opened.

Also, if the urging member is provided for a replacement component such as the developing cartridge, it may be necessary to provide the urging member for each replacement component, so that the cost of the replacement component increases.

SUMMARY

The present disclosure has been made in view of the above circumstances, and one of objects of the present disclosure is to provide an image forming apparatus in which a photosensitive member cartridge is configured to be easily mounted and demounted in a configuration having a waste developer container.

Another one of the objects of the present disclosure is to provide an image forming apparatus capable of preventing an urging force of an urging member configured to press a developer carrier to a photosensitive member from influencing a front cover and the like, and suppressing an increase in the cost of a replacement component.

According to an illustrative embodiment of the present disclosure, there is provided an image forming apparatus including: a main body; a photosensitive member, and a developing cartridge configured to be mounted and demounted to and from the main body and to have a developer carrier configured to be rotatable about an axis line. The main body includes: an urging member configured to urge the developing cartridge; and a first guide configured to guide the developing cartridge. The developing cartridge includes an end portion in the axis line, the end portion having a guided part configured to be guided by the first guide of the main body. The developing cartridge is configured to rotate about the guided part between a first position at which the urging member cannot urge the developing cartridge and a second position at which the urging member can urge the developing cartridge. The developer carrier is spaced apart from the photosensitive member when the developing cartridge is located at the second position.

According to another illustrative embodiment of the present disclosure, there is provided n image forming apparatus including: a main body; a photosensitive member cartridge including a photosensitive drum; and a developing cartridge configured to be mounted and demounted to and from the main body and to have a developing roller configured to be rotatable about an axis line. The main body includes: an urging member configured to urge the developing cartridge; and a first guide configured to guide the developing cartridge. The developing cartridge includes an end portion in the axis line, the end portion having a guided part configured to be guided by the first guide of the main body. The developing cartridge is configured to rotate about the guided part between a first position at which the urging member not urges the developing cartridge and a second position at which the urging member can press the developing cartridge. The developing roller is spaced apart from the photosensitive drum when the developing cartridge is located at the second position.

According to still another illustrative embodiment of the present disclosure, there is provided an image forming apparatus including: a main body; a photosensitive member cartridge configured to be mounted and demounted to and from a main body and to have a photosensitive member configured to be rotatable about an axis line, a cleaner configured to collect developer from the photosensitive member, and a waste developer container configured to accommodate therein the developer collected from the cleaner; an exposing unit configured to irradiate light towards the photosensitive member along an exposing light path; and a developing cartridge configured to be mounted and demounted to and from the main body and to have a developer carrier. The waste developer container is configured to moveable between a first position at which the waste developer container does not overlap with the exposing light path and a second position at which the waste developer container overlaps with the exposing light path, in a state where the photosensitive member cartridge is mounted to the main body.

BRIEF DESCRIPTION OF THE DRAWINGS

In the accompanying drawings:

FIGS. 4A and 4B are views of a second side frame, as seen from an outside, in which FIG. 4A illustrates an interlocking mechanism with a cover part being closed, and FIG. 4B illustrates the interlocking mechanism with the cover part being opened;

DETAILED DESCRIPTION

Figure 1:
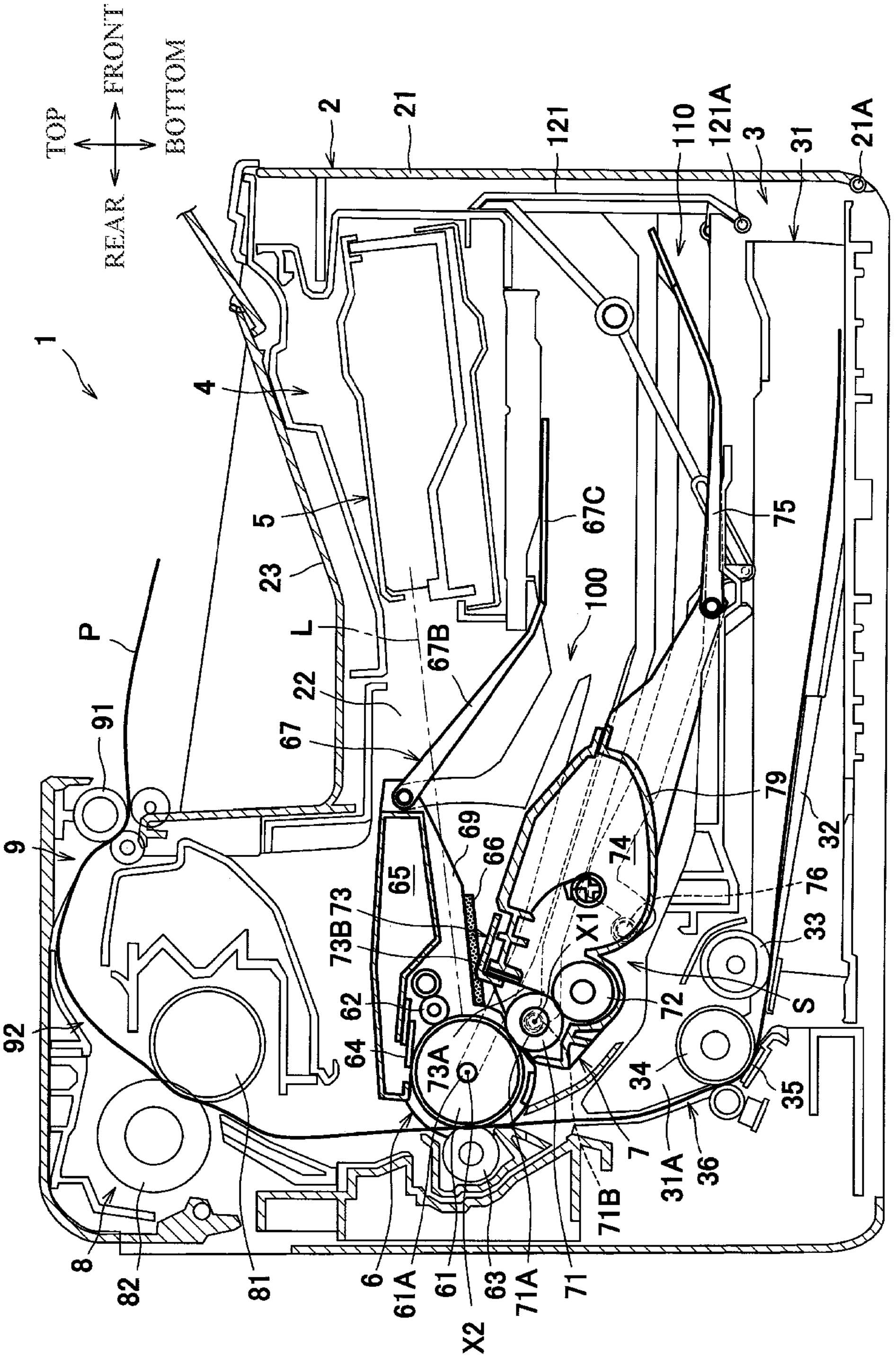
FIG. 1 is a view illustrating a schematic configuration of a laser printer according to an illustrative embodiment of the present disclosure.

Hereinafter, an illustrative embodiment of the present disclosure will be described in detail with reference to the drawings. In the following descriptions, an overall configuration of a laser printer 1, which is an example of the image forming apparatus, will be first described and the features of the present disclosure will be then described in detail.

The following description will be made with the directions defined with respect to a user who uses the laser printer 1. That is, in FIG. 1, a right side of the drawing sheet is referred to as a 'front side', a left side of the drawing sheet is referred to as a 'rear side', an inner side of the drawing sheet is referred to as a 'right side' and a front side of the drawing sheet is referred to as a 'left side'. Also, an upper-lower direction of the drawing sheet is referred to as an 'upper-lower direction.'

<Schematic Configuration of Laser Printer>

As shown in FIG. 1, the laser printer 1 is provided with, in an apparatus main body 2, a feed unit 3, an image forming unit 4 and a discharge unit 9.

A front side part of the apparatus main body 2 is provided with a first front cover 21 and a second front cover 121. The first front cover 21 is configured to be rotatable about a rotary shaft 21A provided at a lower part of the apparatus main body 2 and serving as a center of rotation. The first front cover 21 is configured to cover a front side of a sheet feeding tray 31. The first front cover 21 is configured to move to a position shown in FIG. 6 and to thus open the front side of the sheet feeding tray 31 so that sheets P can be placed in the sheet feeding tray 31.

The second front cover 121 is configured to be rotatable about a rotary shaft 121A serving as a center of rotation at an inner side of the first front cover 21. The second front cover 121 is configured to cover an opening 2A (refer to FIG. 4B) formed below an exposing unit 5 and to open and close the opening 2A.

The apparatus main body 2 has a pair of side frames 22 provided at both left and right sides. The side frame 22 has a photosensitive member guide 100 configured to guide a photosensitive member cartridge 6 (which will be described later) to a photosensitive member mounting position, which is a position of the photosensitive member cartridge 6 in an installed state, and a developing cartridge guide 110 configured to guide a developing cartridge 7 (which will be described later) to a developing cartridge mounting position, which is a position of the developing cartridge 7 in an installed state.

The feed unit 3 is configured to feed the sheet P, which is an example of the recording sheet, to the image forming unit 4 and is provided at a lower part in the apparatus main body 2. The feed unit 3 mainly has the sheet feeding tray 31, a sheet pressing plate 32, a pick-up roller 33 and a separation roller 34 supported to a sheet feeding frame 31A, a separation pad 35 and a supply path 36.

The supply path 36 is a path for conveying the sheet P fed from the sheet feeding tray 31 towards between a photosensitive drum 61 and a transfer roller 63, and extends rearwards from a vicinity of the pick-up roller 33, is curved upwards from a vicinity of the separation roller 34 and extends towards between the photosensitive drum 61, which is an example of the photosensitive member, and the transfer roller 63.

The sheets P placed in the sheet feeding tray 31 are arranged to be close to the pick-up roller 33 by the sheet pressing plate 32 and are fed by the pick-up roller 33. The fed sheets P are separated one by one by the separation roller 34 and the separation pad 35, which is then curved upwards at the rear side of the apparatus main body 2 and is conveyed towards the image forming unit 4 (photosensitive drum 61).

The image forming unit 4 is configured to form an image on the fed sheet P and is provided above the sheet feeding tray 31. The image forming unit 4 has the exposing unit 5, the photosensitive member cartridge 6, the developing cartridge 7, the transfer roller 63 and a fixing device 8.

The exposing unit 5 is provided above the front side in the apparatus main body 2, and has a laser light emitting unit, a polygon mirror, a lens, a reflector and the like, which are not shown. The exposing unit 5 is configured to irradiate a laser beam onto a surface of the photosensitive drum 61 by high-speed scanning.

The photosensitive member cartridge 6 is arranged in the vicinity of a center of a rear side of the apparatus main body 2 in the upper-lower direction, specifically, at the substantially same position as the exposing unit 5 in the upper-lower direction, and is configured to be mounted and demounted from the opening 2A (refer to FIG. 4B) with respect to the apparatus main body 2. The photosensitive member cartridge 6 mainly has a photosensitive member frame 69, the photosensitive drum 61 provided for the photosensitive member frame 69 and a charging roller 62.

The developing cartridge 7 is arranged below the photosensitive member cartridge 6 and is configured to be mounted and demounted from the opening 2A with respect to the apparatus main body 2. The developing cartridge 7 has a developing frame 79, a developing roller 71, which is an example of the developer carrier provided for the developing frame 79, a supply roller 72, a layer thickness regulation blade 73 and a toner accommodation unit 74. The developing cartridge 7 is arranged in an accommodation space S shown in FIG. 1 at a developing cartridge mounting position. The accommodation space S is a space formed by the photosensitive member cartridge 6 and the sheet feeding frame 31A positioned below the developing cartridge 7. The developing roller 71 is configured to be rotatable about a developing axis line X1 of a developing roller shaft 71A, which is an example of the first axis line.

The layer thickness regulation blade 73 is configured to contact the developing roller 71, thereby regulating a layer thickness of toner on the developing roller 71. The layer thickness regulation blade 73 has a blade main body 73A and a reinforcement plate 73B configured to reinforce the blade main body 73A. The reinforcement plate 73B is fixed to an upper surface of the developing frame 79.

The transfer roller 63 is provided for the apparatus main body 2 and is arranged to face the photosensitive drum 61 from rear.

The fixing device 8 is arranged above the photosensitive member cartridge 6 and mainly has a heating roller 81 and a pressing roller 82.

In the image forming unit 4, a surface of the photosensitive drum 61 is uniformly charged by the charging roller 62 and is then exposed by the high-speed scanning of the laser light emitted from the exposing unit 5, so that an electrostatic latent image is formed on the photosensitive drum 61. Also, the toner in the toner accommodation unit 74 is supplied to the developing roller 71 by the supply roller 72 and is then carried on the developing roller 71.

The toner carried on the developing roller 71 is supplied to the electrostatic latent image on the photosensitive drum 61, so that the electrostatic latent image becomes visible and a toner image is thus formed on the photosensitive drum 61.

After that, the sheet P fed from the feed unit 3 is conveyed through between the photosensitive drum 61 and the transfer roller 63, so that the toner image on the photosensitive drum 61 is transferred to the sheet P. Then, the sheet P having passed through the photosensitive drum 61 is conveyed through between the heating roller 81 and the pressing roller 82, so that the toner image transferred to the sheet P is heat-fixed.

The discharge unit 9 is configured to convey the sheet P on which an image is formed as the toner image is heat-fixed towards an outside of the apparatus main body 2, and has discharge rollers 91 and a discharge path 92. The discharge path 92 is a path for conveying the sheet P discharged from the fixing device 8 to a sheet discharge tray 23 while bending the same forwards.

In the discharge unit 9, the sheet P having passed through the image forming unit 4 (photosensitive drum 61) is conveyed towards the discharge rollers 91 with being bent towards the front side of the apparatus main body 2, is discharged to the outside of the apparatus main body 2 and is then placed on the sheet discharge tray 23.

<Photosensitive Member Cartridge>

Figure 2A:
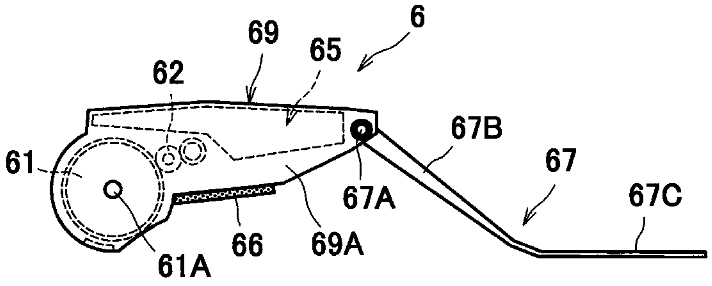
FIG. 2A is a side view of a photosensitive member cartridge.

As shown in FIGS. 1 and 2A, the photosensitive member frame 69 of the photosensitive member cartridge 6 has a cleaning blade 64, a waste toner container 65, which is an example of the waste developer container, an elastic member 66 and a grip 67, in addition to the photosensitive drum 61 and the charging roller 62.

The photosensitive member frame 69 is configured to rotate about a photosensitive member axis line X2, which is an example of the second axis line, at a photosensitive member mounting position. Here, the photosensitive member axis line X2 is an axis line of a photosensitive drum shaft 61A, which is a center of rotation of the photosensitive drum 61. Specifically, the photosensitive member frame 69 is configured to rotate between the photosensitive member mounting position and a rotation position (refer to FIG. 9) to which the photosensitive member frame 69 is rotated in a clockwise direction from the photosensitive member mounting position about the photosensitive member axis line X2.

The cleaning blade 64 is configured to contact an upper circumferential surface of the photosensitive drum 61, thereby collecting the toner on the photosensitive drum 61.

The waste toner container 65 is a container configured to accommodate therein the toner collected from the photosensitive drum 61 by the cleaning blade 64. When the photosensitive member cartridge 6 is located at the photosensitive member mounting position, the waste toner container 65 extends forwards from above the photosensitive drum 61 and is arranged at an opposite side to the sheet feeding tray 31 with a light path L of the laser light emitted from the exposing unit 5 and the developing cartridge 7 being interposed therebetween.

The waste toner container 65 is configured integrally with the photosensitive member frame 69, and is configured to rotate between a waste toner mounting position, which is an example of the first position and the fourth position, which are positions of the waste toner container 65 at the time that the photosensitive member cartridge 6 is located at the photosensitive member mounting position, and a waste toner rotation position, which is an example of the second position and the fifth position, which are positions of the waste toner container 65 at the time that the photosensitive member cartridge 6 is located at the rotation position, about the photosensitive member axis line X2 as the photosensitive member frame 69 is rotated. When the waste toner container 65 is located at the waste toner rotation position, the waste toner container 65 intersects with the light path L and is arranged in the accommodation space S of the developing cartridge 7.

The elastic member 66 is made of a urethane sponge and the like and is provided on a lower surface of the photosensitive member frame 69 corresponding to a position below the waste toner container 65. The elastic member 66 is configured to contact the reinforcement plate 73B on the upper surface of the developing frame 79. The elastic member 66 is contacted to the reinforcement plate 73B, so that the waste toner container 65 located at the waste toner mounting position is restrained from rotating to the waste toner rotation position.

As shown in FIG. 2A, the grip 67 is gripped by a user when mounting and demounting the photosensitive member cartridge 6. The grip 67 is provided at a front end portion of the photosensitive member frame 69. In other words, in this illustrative embodiment, the front end portion of the photosensitive member frame 69 is a part of the waste toner container 65, and the waste toner container 65 has the grip 67.

The grip 67 is configured to be rotatable, with respect to the photosensitive member frame 69, about a rotary shaft 67A supported to the front end portion of the waste toner container 65, and is urged in a counterclockwise direction by a spring and the like (not shown). The grip 67 is restrained from rotating at a position shown in FIG. 10.

The grip 67 has a pair of arm parts 67B extending obliquely in a front-lower direction from both left and right ends of the rotary shaft 67A, and a gripping part 67C connecting respective lower end portions of the pair of arm parts 67B. The gripping part 67C extends forwards from the lower end portions of the arm parts 67B and is positioned below the exposing unit 5 upon the mounting of the photosensitive member cartridge 6 (refer to FIG. 1).

As shown in FIG. 1, the arm parts 67B are provided at outer sides of the light path L of the laser light emitted from the exposing unit 5 in the left-right direction (the direction of the photosensitive member axis line X2) and interpose the light path L therebetween from both left and right sides at a state where the photosensitive member cartridge 6 and the developing cartridge 7 are mounted. The grip 67 is provided in this way, so that it is possible to arrange the grip 67 without interfering with the light path L and to improve the operability of the photosensitive member cartridge 6 (waste toner container 65) when taking out the photosensitive member cartridge 6 from the front.

Figure 2B:
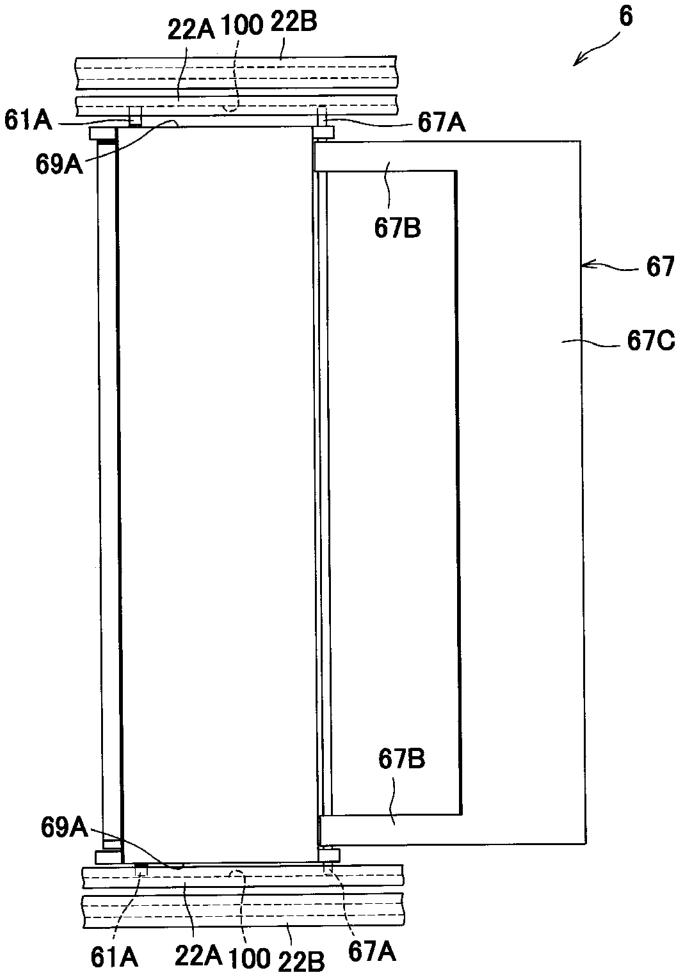
FIG. 2B is a top view of the photosensitive member cartridge.

Also, as shown in FIG. 2B, the rotary shaft 67A of the grip 67 and the photosensitive drum shaft 61A protrude outwards from side surfaces 69A of the photosensitive member frame 69 in the left-right direction and are configured to be guided by the photosensitive member guide 100.

<Developing Cartridge>

Figure 3A:
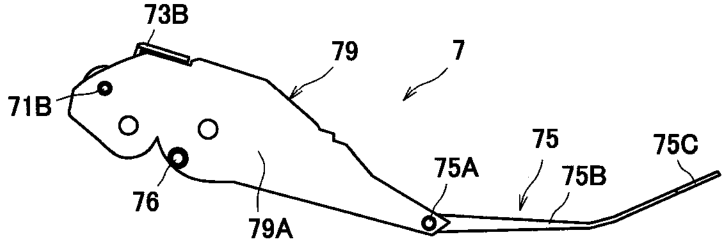
FIG. 3A is a side view of a developing cartridge.
Figure 3B:
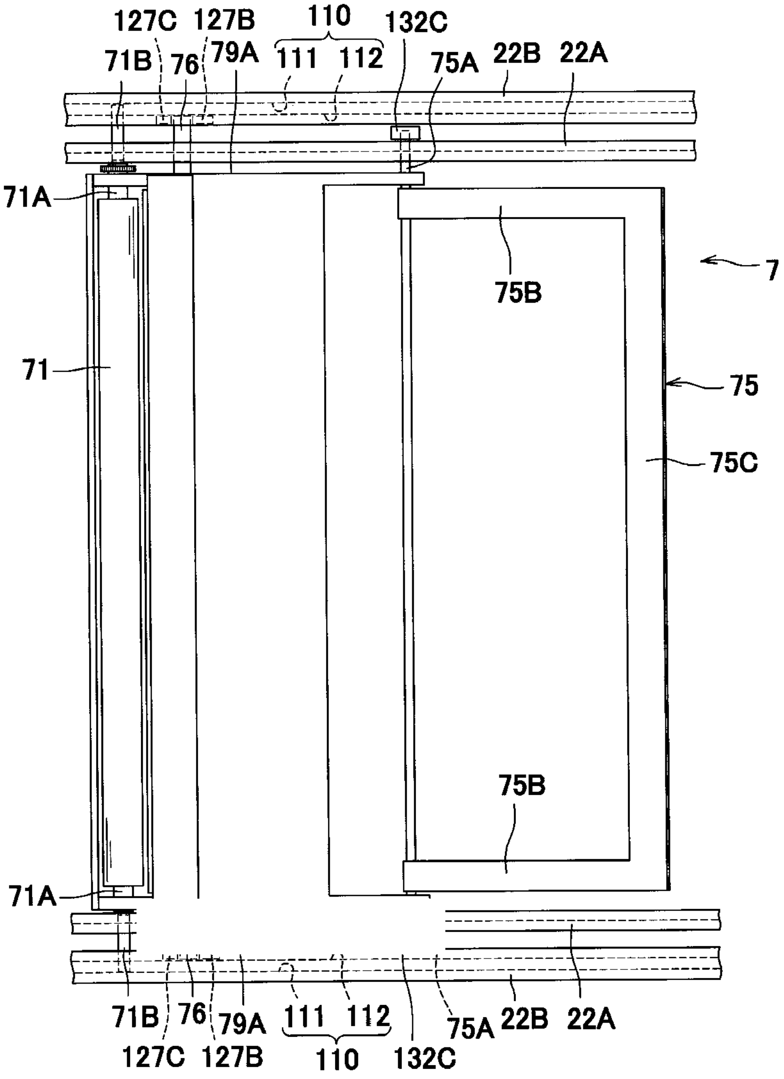
FIG. 3B is a top view of the developing cartridge.

As shown in FIGS. 3A and 3B, the developing cartridge 7 has a grip 75 that is gripped by a user. The grip 75 is configured to be rotatable with respect to the developing frame 79, about a rotary shaft 75A supported to a front end of the developing frame 79.

The grip 75 has a pair of arm parts 75B extending forwards from both left and right ends of the rotary shaft 75A and extending obliquely in a front-upper direction and a gripping part 75C connecting respective front end portions of the pair of arm parts 75B.

As shown in FIG. 3B, the rotary shaft 75A protrudes outwards from side surfaces 79A of the developing frame 79 in the left-right direction. The side surface 79A of the developing frame 79 is provided with a first protrusion shaft 71B, which is an example of the guided part, and a second protrusion shaft 76 protruding outwards from the side surface 79A in the left-right direction, in addition to the rotary shaft 75A.

The first protrusion shaft 71B is coupled to the developing roller shaft 71A and has a diameter smaller than the developing roller shaft 71A. The second protrusion shaft 76 is arranged between the rotary shaft 75A and the first protrusion shaft 71B. The first protrusion shaft 71B and the second protrusion shaft 76 are configured to be guided by the developing cartridge guide 110.

<Side Frame>

Figure 4A:
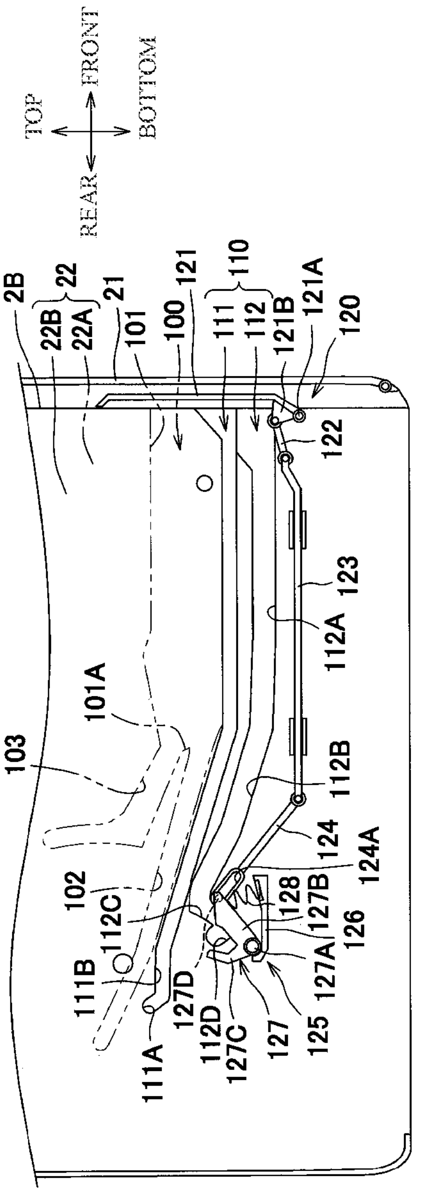

As shown in FIG. 4A, the side frame 22 has a first side frame 22A and a second side frame 22B (also refer to FIG. 3B). The first side frame 22A has the photosensitive member guide 100.

The photosensitive member guide 100 is a guide configured to guide the mounting and demounting of the photosensitive member cartridge 6, and has a first photosensitive member guide 101, a second photosensitive member guide 102 and a third photosensitive member guide 103.

The first photosensitive member guide 101 is a recess configured to pass through between the sheet feeding tray 31 and the exposing unit 5. The first photosensitive member guide 101 extends rearwards from a front end 2B of the apparatus main body 2 and connects to the second photosensitive member guide 102 and the third photosensitive member guide 103, which is an example of the guide part, at a rear end 101A.

The second photosensitive member guide 102 is a recess to which the photosensitive drum shaft 61A can be engaged, and extends obliquely from the rear end 101A of the first photosensitive member guide 101 in a rear-upper direction.

The third photosensitive member guide 103 is a recess to which the rotary shaft 67A of the grip 67 can be engaged, and extends obliquely from an upper side of the second photosensitive member guide 102 in a rear-upper direction at the rear end 101A of the first photosensitive member guide 101 and then extends upwards. The third photosensitive member guide 103 extends upwards to intersect with the light path L of the exposing unit 5, as seen from the left-right direction (also refer to FIG. 1).

The second side frame 22B is provided at an outer side of the first side frame 22A (refer to FIG. 3B) and is provided with the developing cartridge guide 110.

The developing cartridge guide 110 is a guide configured to guide the mounting and demounting of the developing cartridge 7, and has a first developing cartridge guide 111, which is an example of the first guide, and a second developing cartridge guide 112, which is an example of the second guide.

The first developing cartridge guide 111 is a recess to which the first protrusion shaft 71B can be engaged, and has a first part 111A and a second part 111B. The second part 111B is positioned in front of the first part 111A (at an upstream side with respect to a mounting direction of the developing cartridge 7) and extends rearwards from the front end 2B of the apparatus main body 2 so as to pass through between the sheet feeding tray 31 and the exposing unit 5 (refer to FIG. 1), extends obliquely in a rear-upper direction and then extends rearwards. The second part 111B is arranged between a compression spring 128 (which will be described later) and the exposing unit 5, as seen from the left-right direction.

The first part 111A extends from a rear end of the second part 111B in a rearward oblique direction, which is a direction intersecting with the second part 111B. The first protrusion shaft 71B is moved to the vicinity of an upper end of the first part 111A, so that the developing roller 71 is contacted to the photosensitive drum 61.

The second developing cartridge guide 112 is a recess which is configured to be shallower than the first developing cartridge guide 111 and to which the second protrusion shaft 76 can be engaged. The second developing cartridge guide 112 is configured to pass through between the sheet feeding tray 31 and the exposing unit 5 and to define a posture of the developing cartridge 7 together with the first developing cartridge guide 111. The second developing cartridge guide 112 has a first guide part 112A, a second guide part 112B, a third guide part 112C and a fourth guide part 112D.

The first guide part 112A extends rearwards from a position of the front end 2B of the apparatus main body 2 below the first developing cartridge guide 111 and is configured to pass through between the sheet feeding tray 31 and the exposing unit 5. The second guide part 112B extends obliquely from a rear end of the first guide part 112A in a rear-upper direction.

The third guide part 112C extends obliquely from a rear end of the second guide part 112B in a rear-lower direction. When the second protrusion shaft 76 is arranged at a position adjacent to an upper end portion of the third guide part 112C, the developing cartridge 7 is arranged at a non-pressable position, which is an example of the first position at which the developing roller 71 faces the photosensitive drum 61 and the second protrusion shaft 76 of the developing cartridge 7 cannot be pressed by the compression spring 128 (which will be described later) (refer to FIG. 7).

Figure 6:
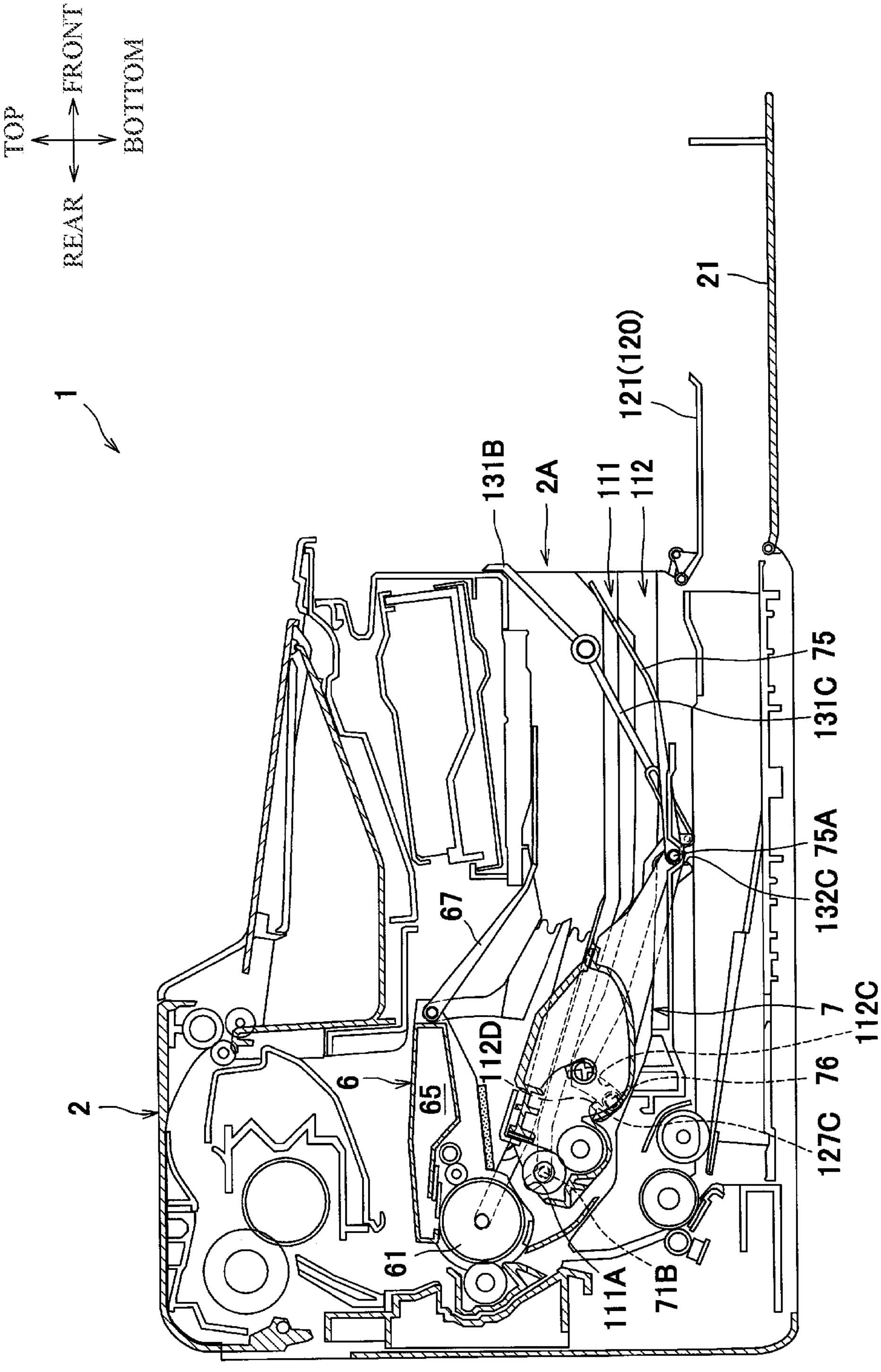
FIG. 6 illustrates a state where a second front cover of the laser printer is opened, illustrating a first arm part arranged at a closed position.

When the second protrusion shaft 76 is arranged at a position adjacent to a lower end portion of the third guide part 112C, the developing cartridge 7 is arranged at a pressable position, which is an example of the second position at which the developing roller 71 faces and is spaced from the photosensitive drum 61 and the second protrusion shaft 76 of the developing cartridge 7 can be pressed towards the photosensitive member cartridge 6 by the compression spring 128 (refer to FIG. 6).

The fourth guide part 112D extends obliquely from a lower end of the third guide part 112C in a rear-upper direction, which is a direction intersecting with the third guide part 112C. In other words, the fourth guide part 112D extends along a direction in which the developing cartridge 7 presses the photosensitive member cartridge 6, which is a direction along which the developing roller 71 located at the developing cartridge mounting position and the photosensitive drum 61 face each other and which is substantially the same direction as the first part 111A.

The second protrusion shaft 76 is guided to a position adjacent to an upper end portion of the fourth guide part 112D along the fourth guide part 112D, so that the first protrusion shaft 71B is guided to a position adjacent to the upper end of the first part 111A along the first part 111A.

When the second protrusion shaft 76 is arranged at the position adjacent to the upper end portion of the fourth guide part 112D, the developing cartridge 7 is arranged at a pressing position, which is an example of the third position at which the second protrusion shaft 76 is pressed by the compression spring 128 (refer to FIG. 1).

Figure 5:
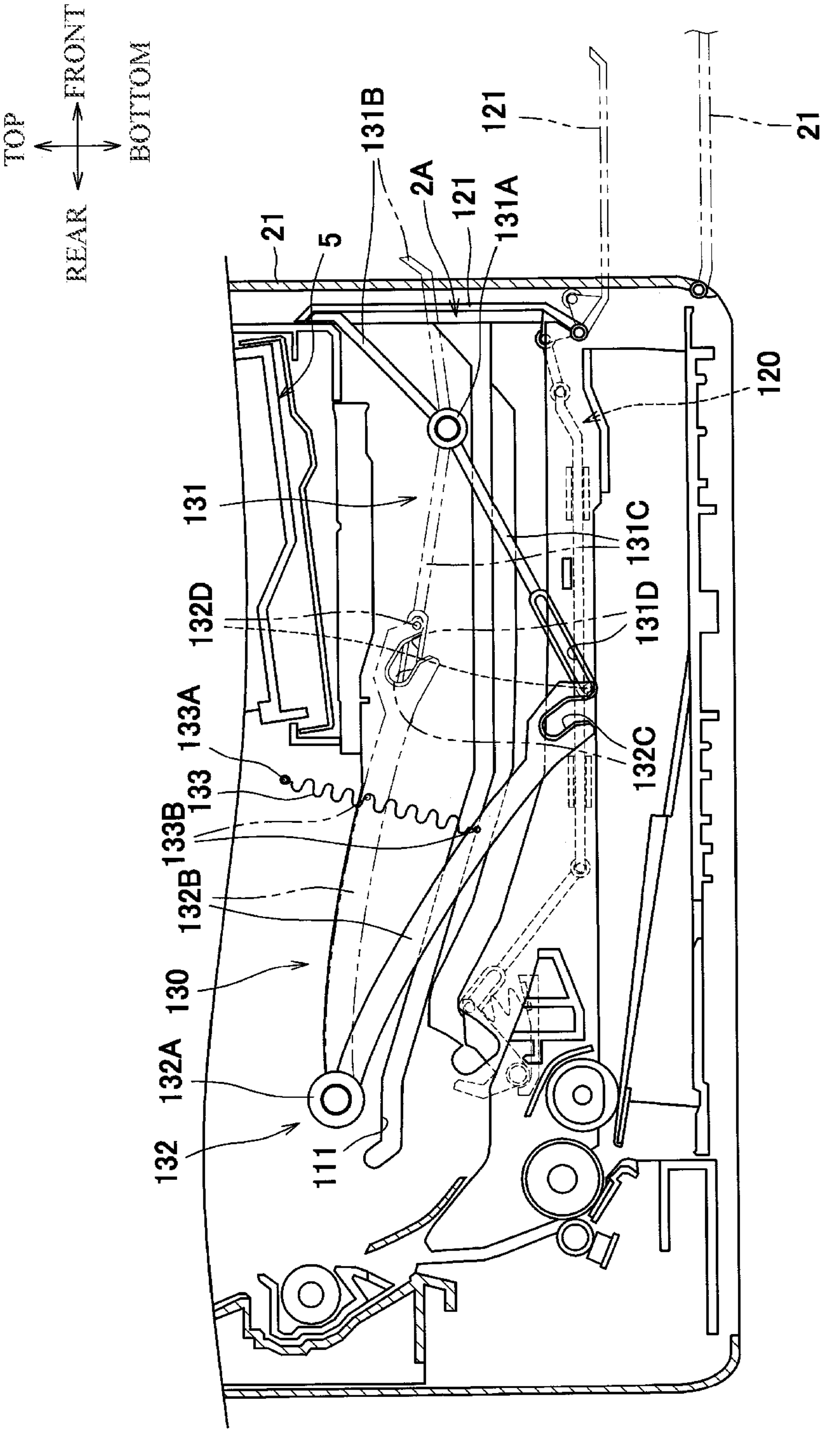
FIG. 5 is a view of the second side frame, as seen from an inside, illustrating a rotation mechanism.

The second side frame 22B is provided with an interlocking mechanism 120 and a rotation mechanism 130 (refer to FIG. 5). The interlocking mechanism 120 functions as an example of the moving mechanism, the first interlocking mechanism and the second interlocking mechanism.

The interlocking mechanism 120 is a mechanism configured to move the second protrusion shaft 76 of the developing cartridge 7 so as to press the developing cartridge 7 towards the photosensitive drum 61, and has a first link 122, a second link 123, a third link 124 and a pressing mechanism 125.

The second front cover 121 has a support part 121B protruding rearwards from a vicinity of a lower end portion becoming a center of rotation and connecting to the first link 122.

The first link 122 is provided to be rotatable for a tip of the support part 121B and a front end of the second link 123. When the second front cover 121 is opened, the first link 122 is pulled and moved forwards by the support part 121B, and when the second front cover 121 is closed, the first link 122 is pushed and moved rearwards by the support part 121B.

The second link 123 is configured to be long in the front-rear direction and is supported to the second side frame 22B to be moveable in the front-rear direction. The second link 123 is rotatably coupled to a rear end of the first link 122 and a front end of the third link 124. Thereby, the second link 123 is configured to be moveable in the front-rear direction, as the first link 122 is moved.

The third link 124 has a front end, which is provided to be rotatable for a rear end of the second link 123, and extends obliquely from the rear end of the second link 123 in a rear-upper direction. The third link 124 is formed at its rear end with a support hole 124A having a long hole for coupling to the pressing mechanism 125. The third link 124 is configured so that a front end thereof is moved in the front-rear direction as the first link 122 and the second link 123 are moved.

The pressing mechanism 125 is a mechanism configured to move the developing cartridge 7 between the pressable position and the pressing position and to press the developing cartridge 7 arranged at the pressing position towards the photosensitive member cartridge 6. The pressing mechanism 125 is arranged below the third guide part 112C and the fourth guide part 112D and above the second link 123, and has a support member 126, a pressing member 127 and the compression spring 128.

The support member 126 is configured to support the compression spring 128 and is fixed to the second side frame 22B.

The pressing member 127 is a member configured to press the second protrusion shaft 76 along the fourth guide part 112D, and is configured to be rotatable with respect to the apparatus main body 2 about a rotary shaft 127A supported to the second side frame 22B.

The pressing member 127 has a first pressing part 127B extending from the rotary shaft 127A and a second pressing part 127C extending from the rotary shaft 127A in a direction different from the first pressing part 127B.

The first pressing part 127B is configured to press the second protrusion shaft 76 of the developing cartridge 7 towards an upper end of the fourth guide part 112D, and has a pin 127D, which is to be engaged to the support hole 124A, at an upper end thereof. The first pressing part 127B is configured to obliquely abut on the second protrusion shaft 76 of the developing cartridge 7 from a front-lower side.

The first pressing part 127B is configured to rotate between an upper position (refer to FIG. 4A), at which it overlaps with a vicinity of the upper end of the fourth guide part 112D, and a lower position (refer to FIG. 4B) retreated downwards from the upper position, as seen from the left-right direction. The first pressing part 127B is configured to press the second protrusion shaft 76 at the upper position. At the lower position, the first pressing part 127B is lowered and arranged to a position at which the second protrusion shaft 76 can be arranged at a lower end of the fourth guide part 112D and a lower end of the third guide part 112C.

The second pressing part 127C is arranged at an interval from the first pressing part 127B so that the second protrusion shaft 76 of the developing cartridge 7 can be inserted between the second pressing part 127C and the first pressing part 127B, and is configured to abut on the second protrusion shaft 76 of the developing cartridge 7 from the rear.

When the first pressing part 127B is located at the upper position, the second pressing part 127C is arranged at a rear position of the fourth guide part 112D at which the second pressing part 127C does not overlap with the fourth guide part 112D, as seen from the left-right direction, and when the first pressing part 127B is located at the lower position, the second pressing part 127C is arranged at a position at which the second pressing part 127C overlaps with the fourth guide part 112D.

When the first pressing part 127B is located at the lower position, the second pressing part 127C is arranged at a position at which it does not overlap with the lower end of the fourth guide part 112D so that the second protrusion shaft 76 can move in the third guide part 112C, as seen from the left-right direction.

The compression spring 128 is provided between the support member 126 and the first pressing part 127B, and is configured to obliquely urge the first pressing part 127B in a rear-upper direction so that the first pressing part 127B is located at the upper position. The compression spring 128 is configured to urge the developing cartridge 7 via the first pressing part 127B.

As shown in FIG. 5, the rotation mechanism 130 is a mechanism configured to rotate the developing cartridge 7 about the first protrusion shaft 71B, and has a first rotation member 131, a second rotation member 132 and a coil spring 133.

The first rotation member 131 is configured to be rotatable about a rotary shaft 131A provided at an upper side of the first developing cartridge guide 111, which is a front side part of the apparatus main body 2. The first rotation member 131 has a first arm part 131B, which extends obliquely from the rotary shaft 131A in a front-upper direction, and a second arm part 131C, which extends obliquely from the rotary shaft 131A in a rear-lower direction, at a state where the second front cover 121 is closed.

The first rotation member 131 is configured to rotate between a closed position (a solid line position) and an opened position (a dashed-two dotted line) to which the first rotation member 131 is rotated downwards (clockwise direction) from the closed position. The first arm part 131B has a tip, which can be engaged with an upper part of the opening 2A and a tip of the second front cover 121. The second front cover 121 of the closed state is engaged, so that the closed state of the first arm part 131B can be kept.

The second arm part 131C is formed at its tip with a long hole 131D configured to moveably and rotatably support the second rotation member 132 (a pin 132D, which will be described later).

The second rotation member 132 is configured to rotate about a rotary shaft 132A provided at an upper side of a rear end portion of the first developing cartridge guide 111. The second rotation member 132 has a support arm 132B extending obliquely from the rotary shaft 132A in a front-lower direction. The support arm 132B has a shaft support part 132C and a pin 132D at a tip portion thereof.

The shaft support part 132C is a recess configured to be engageable with the rotary shaft 75A of the developing cartridge 7 and to hold the rotary shaft 75A. The pin 132D is engaged with the long hole 131D of the second arm part 131C.

The coil spring 133 is configured to urge upwards the support arm 132B. An upper end 133A of the coil spring 133 is engaged to the second side frame 22B and a lower end 133B thereof is engaged to the support arm 132B above the support arm 132B.

<Mounting and Demounting Operations of Developing Cartridge>

The mounting and demounting operations of the developing cartridge 7 are described.

Figure 4B:
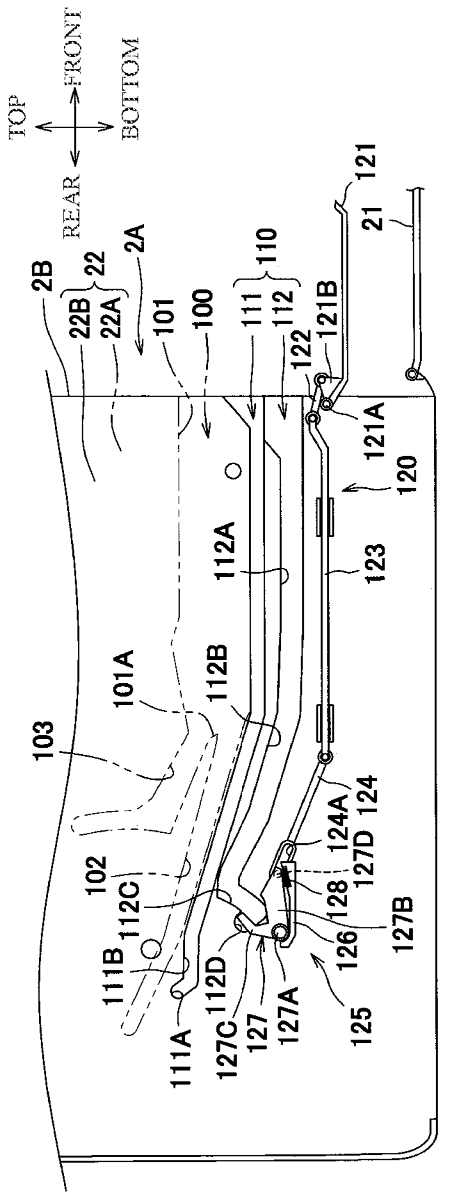

As shown in FIG. 4B, when the first front cover 21 and the second front cover 121 are opened from the mounting state shown in FIG. 1, the first link 122 is pulled forwards by the support part 121B and the second link 123 is also correspondingly moved forwards. When the second link 123 is moved forwards, the third link 124 is rotated about the front end thereof in the counterclockwise direction, so that the pin 127D of the first pressing part 127B to be engaged to the support hole 124A is pushed to an edge of the support hole 124A and the pressing member 127 is rotated from the upper position to the lower position against the urging force of the compression spring 128.

At this time, as shown in FIG. 6, the second protrusion shaft 76 is moved from the position adjacent to the upper end of the fourth guide part 112D to the position of the lower end of the third guide part 112C by an own weight of the developing cartridge 7 and the pressing of the second pressing part 127C from the rear. That is, the developing cartridge 7 is moved from the pressing position to the pressable position. In conjunction with the movement, the first protrusion shaft 71B is moved from the position adjacent to the upper end of the first part 111A to the position of the lower end of the first part 111A.

Thereby, it is possible to move the developing cartridge 7 from the pressing position to the pressable position and to space the developing roller 71 from the photosensitive drum 61 in conjunction with the opening operation of the second front cover 121.

After the developing cartridge 7 is arranged at the pressable position, the support arm 132B is pulled and is rotated in the counterclockwise direction by the coil spring 133, as shown in FIG. 5. When the support arm 132B is rotated and the tip thereof is lifted up, the pin 132D lifts up an upper edge of the long hole 131D while moving from a rear edge of the long hole 131D to a front edge thereof, so that the rear end of the second arm part 131C is raised upwards. At this time, the second front cover 121 is located at the opened position, so that it does not disturb the rotation of the first rotation member 131 (first arm part 131B).

Figure 7:
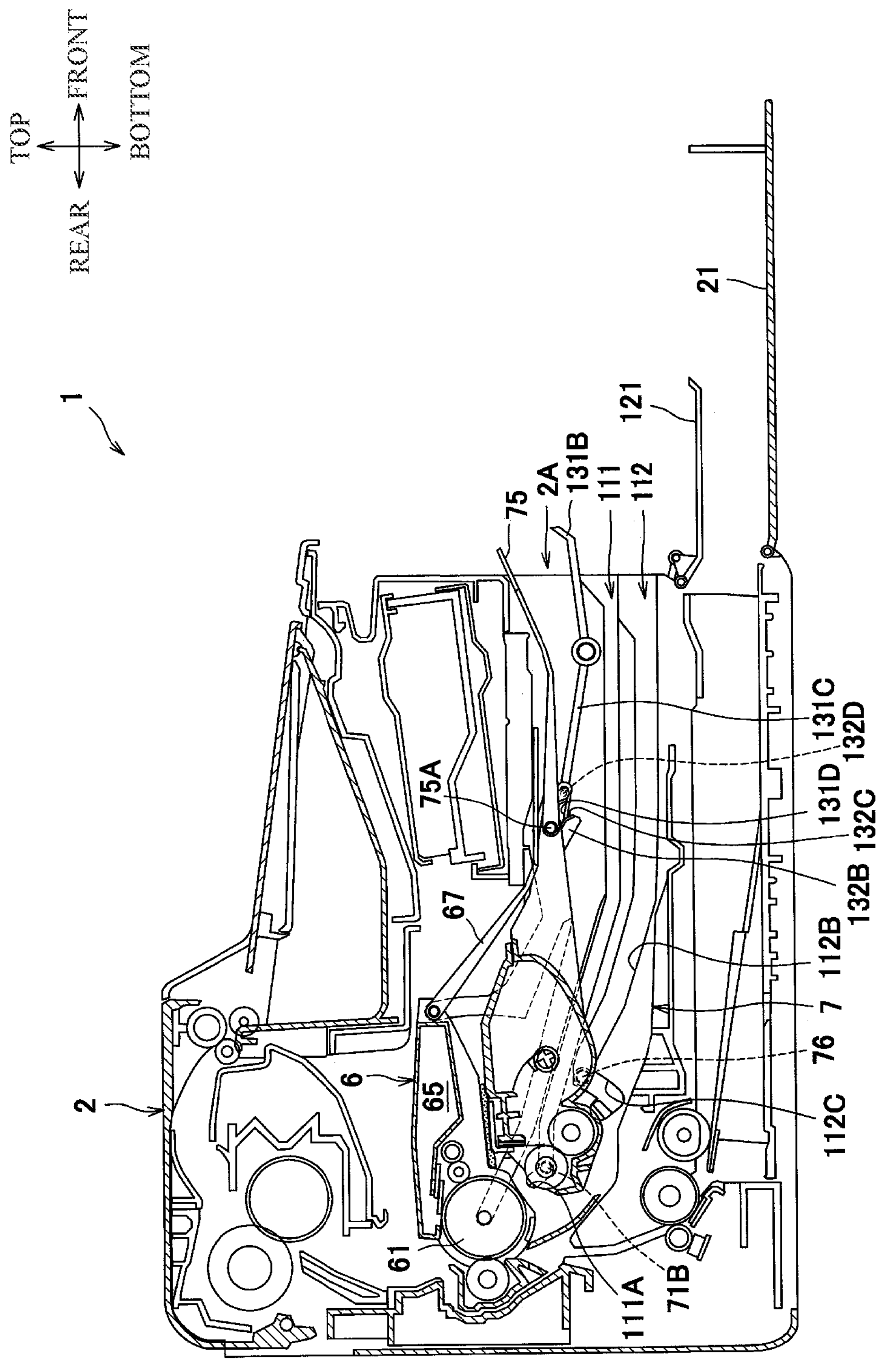
FIG. 7 illustrates a state where the second front cover of the laser printer is opened, illustrating the first arm part arranged at an opened position.

As shown in FIG. 7, when the tip of the support arm 132B is lifted up, the rotary shaft 75A of the developing cartridge 7 is lifted up by the shaft support part 132C. At this time, the developing cartridge 7 is rotated about the first protrusion shaft 71B positioned at the lower end portion of the first part 111A and the second protrusion shaft 76 is moved from the lower end of the third guide part 112C to the upper end thereof, so that the developing cartridge 7 is moved from the pressable position to the non-pressable position. When the user pulls out the developing cartridge 7 in an oblique front-lower direction with gripping the grip 75, the rotary shaft 75A is separated from the shaft support part 132C and the developing cartridge 7 is taken out from the opening 2A (refer to FIGS. 8 and 9).

On the other hand, when mounting the developing cartridge 7, after the first protrusion shaft 71B is inserted into the first developing cartridge guide 111 and the second protrusion shaft 76 is inserted into the second developing cartridge guide 112, the rotary shaft 75A is engaged with the shaft support part 132C to arrange the developing cartridge 7 at the non-pressable position. As shown in FIG. 5, the first rotation member 131 is rotated from the opened position to the closed position, and the rear end of the second arm part 131C is lowered downwards. When the second arm part 131C is lowered, the pin 132D of the support arm 132B is pushed down by the upper edge of the long hole 131D while moving from the front edge of the long hole 131D to the rear edge thereof along the long hole 131D, so that the support arm 132B is rotated about the rotary shaft 132A and the front end of the support arm 132B is lowered.

As shown in FIG. 6, when the front end of the support arm 132B is lowered, the rotary shaft 75A of the developing cartridge 7 is pushed down by the shaft support part 132C. At this time, the developing cartridge 7 is rotated about the first protrusion shaft 71B positioned at the lower end portion of the first part 111A and the second protrusion shaft 76 is moved from the upper end of the third guide part 112C to the lower end thereof, so that the developing cartridge 7 is moved from the non-pressable position to the pressable position.

As shown in FIG. 4A, when the developing cartridge 7 is arranged at the pressable position and the second front cover 121 is closed, the first link 122 is pushed rearwards by the support part 121B and the second link 123 is also correspondingly moved rearwards. When the second link 123 is moved rearwards, the third link 124 is rotated about the front end thereof in the clockwise direction and the pin 127D of the first pressing part 127B to be engaged to the support hole 124A is lifted up by the edge and the first pressing part 127B is rotated from the lower position to the upper position.

When the second protrusion shaft 76 is pressed upwards by the first pressing part 127B, the second protrusion shaft 76 is moved to the vicinity of the upper end of the fourth guide part 112D, the first protrusion shaft 71B is moved to the position adjacent to the upper end of the first part 111A and the developing cartridge 7 is moved from the pressable position to the pressing position (refer to FIG. 1). Then, the first pressing part 127B is urged by the compression spring 128, so that the developing roller 71 is pressed towards the photosensitive drum 61 and the developing cartridge 7 is mounted to the apparatus main body 2.

Thereby, it is possible to move the developing cartridge 7 from the pressable position to the pressing position and to press the developing roller 71 to the photosensitive drum 61 in conjunction with the closing operation of the second front cover 121.

<Mounting and Demounting Operations of Photosensitive Member Cartridge>

The mounting and demounting operations of the photosensitive member cartridge 6 are described.

Figure 8:
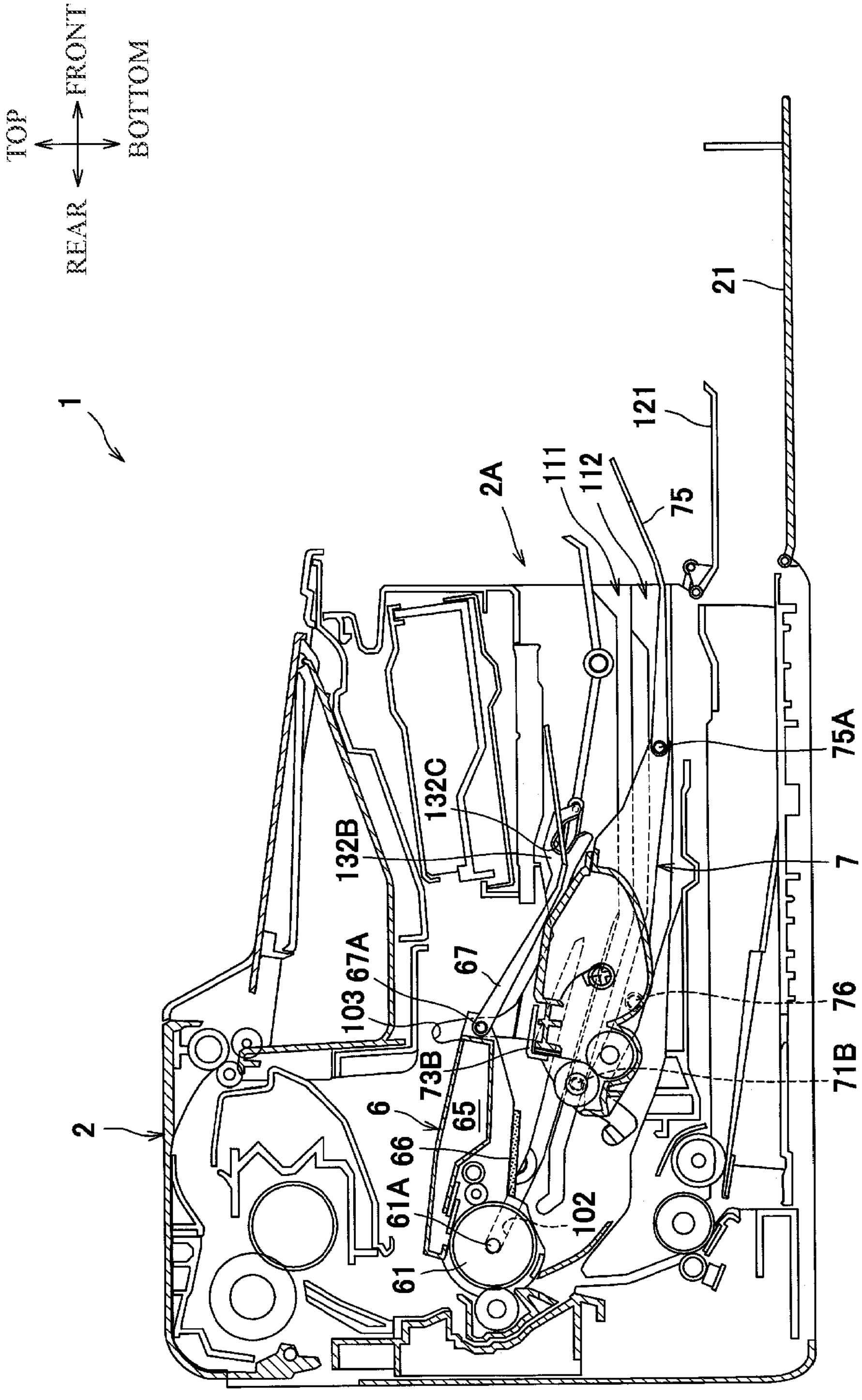
FIG. 8 illustrates a state where the developing cartridge is being guided by a developing cartridge guide, in which an aspect that the photosensitive member cartridge is being rotated towards a waste toner rotating position is illustrated.
Figure 9:
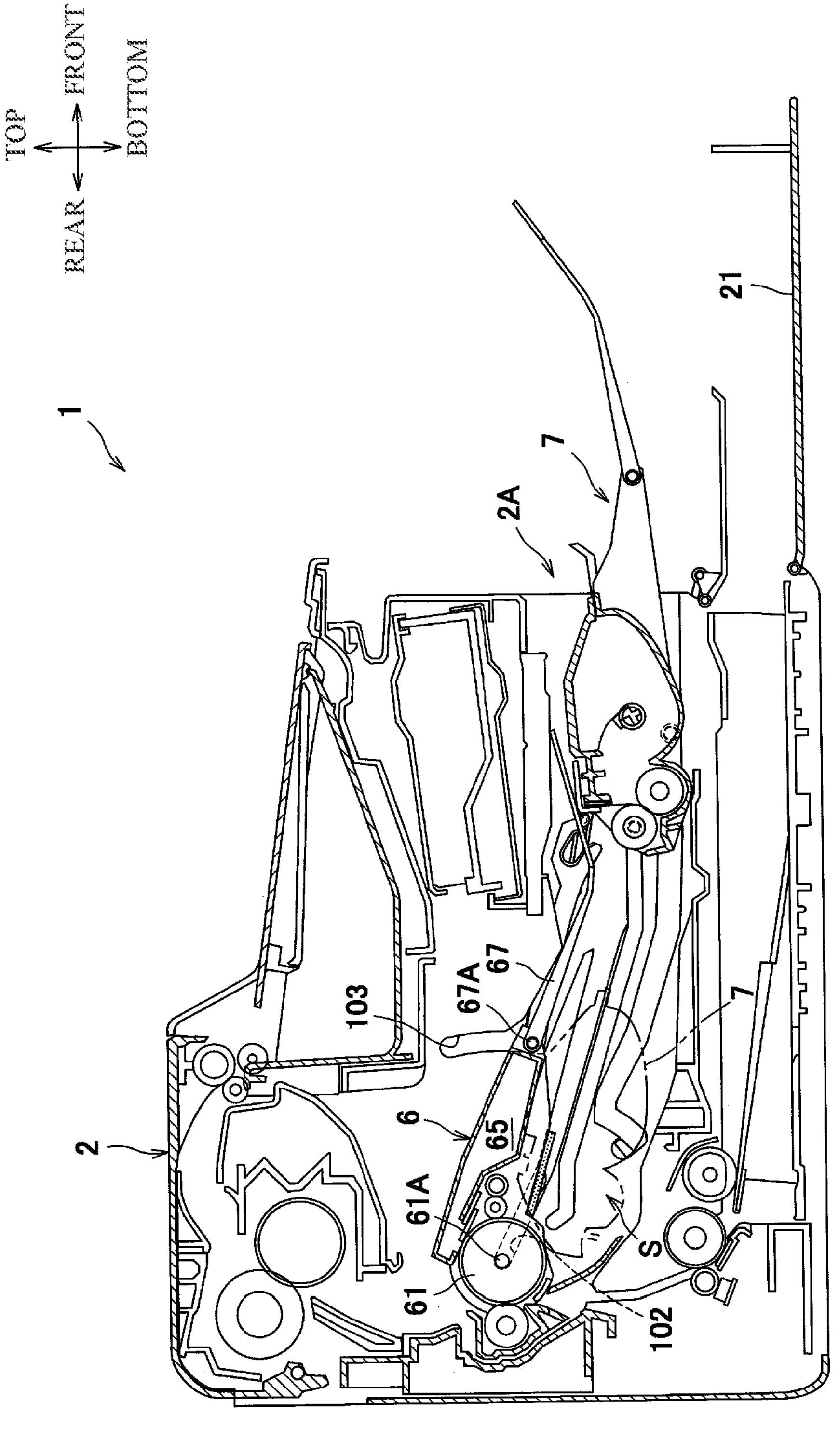
FIG. 9 illustrates a state where the developing cartridge is being guided by the developing cartridge guide, in which an aspect that the photosensitive member cartridge is rotated to the waste toner rotating position is illustrated.

When the developing cartridge 7 is separated from the mounting state shown in FIG. 1, the contact between the elastic member 66 and the reinforcement plate 73B is released, as shown in FIG. 8. Thereby, the photosensitive member cartridge 6 is rotated about the photosensitive drum shaft 61A by the own weight thereof or urging force of a spring (spring configured to urge the grip 67) (not shown), and the rotary shaft 67A of the grip 67 is lowered downwards along the third photosensitive member guide 103. That is, as shown in FIG. 9, the photosensitive member cartridge 6 is rotated from the photosensitive member mounting position to the rotation position at which the waste toner container 65 is arranged in the accommodation space S of the developing cartridge 7. In other words, the waste toner container 65 is rotated from the waste toner mounting position to the waste toner rotation position.

Thereby, since the waste toner container 65 is moved to the waste toner rotation position by the separation operation of the developing cartridge 7, it is possible to improve the operability of the laser printer 1.

Figure 10:
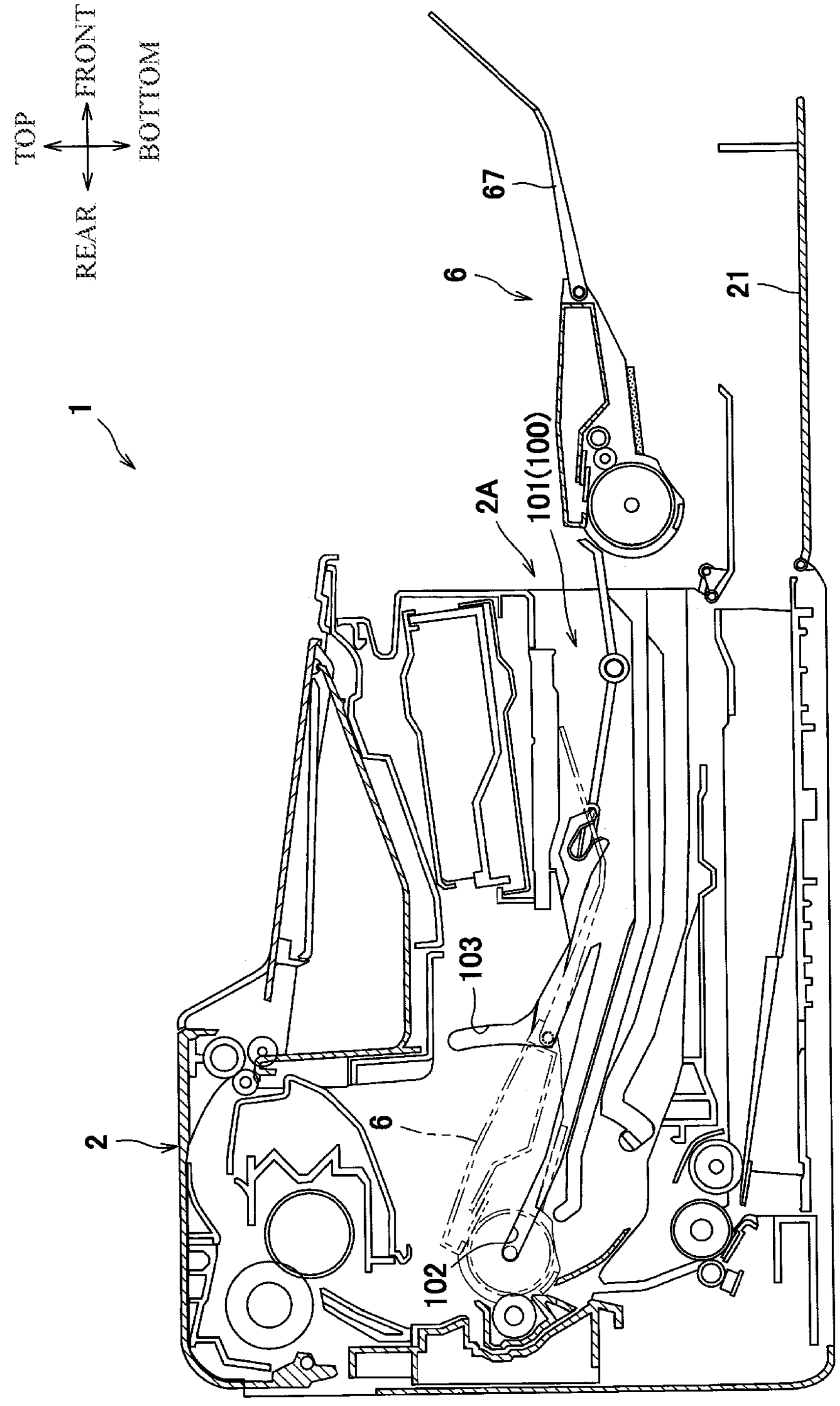
FIG. 10 illustrates a state where the photosensitive member cartridge is taken out from an opening.

When the waste toner container 65 is rotated to the waste toner rotation position, the user takes out the photosensitive member cartridge 6 from the opening 2A along the photosensitive member guide 100 with gripping the grip 67, as shown in FIG. 10.

On the other hand, when mounting the photosensitive member cartridge 6, the photosensitive drum shaft 61A and the rotary shaft 67A are inserted with being conformed to the respective guides 102, 103 into the apparatus main body 2 from the opening 2A. Thereby, the waste toner container 65 of the photosensitive member cartridge 6 is arranged at the waste toner rotation position at a downstream side of the apparatus main body 2 with respect to the mounting direction of the photosensitive member cartridge 6, as shown in FIG. 9. After that, when the developing cartridge 7 is arranged at the developing cartridge mounting position, as described above, the elastic member 66 is pushed up by the reinforcement plate 73B, as shown in FIG. 1, so that the waste toner container 65 is raised to the waste toner mounting position and the photosensitive member cartridge 6 is arranged at the photosensitive member mounting position.

Thereby, since the waste toner container 65 is moved to the waste toner mounting position by the mounting operation of the developing cartridge 7, it is possible to improve the operability of the laser printer 1.

According to the above illustrative embodiment, it is possible to accomplish following operational advantages.

For example, when the photosensitive member cartridge 6 is mounted or demounted between the sheet feeding tray 31 and the exposing unit 5 at a posture of the waste toner container 65 located at the waste toner mounting position, the waste toner container 65 is likely to interfere with the exposing unit 5. However, according to the above illustrative embodiment, the waste toner container 65 is moved to the waste toner rotation position, so that the waste toner container 65 is inclined downwards and faces towards between the exposing unit 5 and the feed unit 3. Therefore, it is possible to prevent the waste toner container 65 from interfering with the exposing unit 5 when mounting and demounting the photosensitive member cartridge 6.

Also, since the second side frame 22B is provided with the compression spring 128 configured to press the developing roller 71 to the photosensitive drum 61 via the first pressing part 127B, the reactive force of the urging member is not applied to the front cover and the like, unlike the related art. Also, since the compression spring 128 is provided for the second side frame 22B, not the developing cartridge 7 that is a replacement component, it is possible to suppress the increase in the cost of the replacement component.

Here, in a configuration where the waste toner container 65 has the cleaning blade 64, when the waste toner container 65 is rotated with respect to the photosensitive member frame 69, the contact position of the cleaning blade 64 and the photosensitive drum 61 is moved, so that the cleaning blade 64 can easily damage the photosensitive drum 61.

However, according to the above illustrative embodiment, since the waste toner container 65 is configured to rotate integrally with the photosensitive member frame 69, a positional relation between the cleaning blade 64 and the photosensitive drum 61 is not changed, so that it is possible to suppress the cleaning blade 64 from damaging the photosensitive drum 61 by the rotation of the photosensitive member cartridge 6.

Although the illustrative embodiment of the present disclosure has been described, the present disclosure is not limited to the above illustrative embodiment. The specific configurations can be appropriately changed without departing from the gist of the present disclosure.

In the above illustrative embodiment, the waste toner container 65 is configured to rotate integrally with the photosensitive member frame 69. However, the present disclosure is not limited thereto. For example, the waste toner container 65 may be configured to rotate with respect to the photosensitive member frame 69. Also, the waste toner container 65 may be configured to rotate about a second axis line, which is different from the photosensitive member axis line X2 parallel with the developing axis line X1.

In the above illustrative embodiment, the photosensitive member cartridge 6 has the cleaning blade 64. However, the present disclosure is not limited thereto. For example, the photosensitive member cartridge 6 may have a cleaning roller.

In the above illustrative embodiment, the interlocking mechanism 120 has been exemplified as the moving mechanism. However, the present disclosure is not limited thereto. For example, a moving mechanism configured not to operate in conjunction with the second front cover may be provided.

In the above illustrative embodiment, the first interlocking mechanism and the second interlocking mechanism are configured as the common interlocking mechanism 120. However, the present disclosure is not limited thereto. For example, the first interlocking mechanism and the second interlocking mechanism may be configured as separate mechanisms, respectively.

In the above illustrative embodiment, the developing cartridge guide 110 has the second developing cartridge guide 112, which is an example of the second guide. However, the present disclosure is not limited thereto. For example, the developing cartridge guide 110 may not have the second developing cartridge guide.

In the above illustrative embodiment, the first protrusion shaft 71B has been exemplified as the guided part. However, the present disclosure is not limited thereto. For example, the guided part may not be the first protrusion shaft 71B.

In the above illustrative embodiment, the photosensitive member cartridge 6 is configured to rotate in conjunction with the mounting and demounting operations of the developing cartridge 7. However, the present disclosure is not limited thereto. For example, the photosensitive member cartridge 6 may be configured to move in conjunction with the opening and closing operations of the second front cover 121.

In the above illustrative embodiment, the developing roller 71 has been exemplified as the developer carrier. However, the present disclosure is not limited thereto. For example, a developing sleeve having a magnet roller arranged therein or a brush-shaped roller may be adopted.

In the above illustrative embodiment, the contact developing type laser printer 1 in which the toner is supplied from the developing roller 71 contacting the photosensitive drum 61 to the photosensitive drum 61 has been exemplified. However, the present disclosure is not limited thereto. For example, a non-contact developing type image forming apparatus in which the developing is performed at a state where a predetermined interval is formed between the photosensitive drum and the developing roller may be adopted.

In the above illustrative embodiment, the waste toner container 65 is configured integrally with the photosensitive member frame 69. However, the present disclosure is not limited thereto. For example, the waste toner container 65 may be configured as a component separate from the photosensitive member frame 69.

In the above illustrative embodiment, the accommodation space S of the developing cartridge 7 is formed between the photosensitive member cartridge 6 and the sheet feeding frame 31A. However, the developing cartridge 7 may be mounted between the separation roller 34 and pick-up roller 33 supported to the apparatus main body 2 and the photosensitive member cartridge 6, without providing the sheet feeding frame.

In the above illustrative embodiment, the monochrome laser printer 1 has been exemplified as the image forming apparatus. However, the present disclosure is not limited thereto. For example, the other image forming apparatuses such as a copier may also be adopted.

What is claimed is:

1. An image forming apparatus comprising:

a main body comprising:
- a front wall having an opening; and
- a rear wall opposite to the front wall;

a side frame disposed in the main body, the side frame having:
- a photosensitive member cartridge guide and
- a developing cartridge guide;

a sheet feeding tray for supporting a sheet, the sheet feeding tray disposed in the main body;

a photosensitive member cartridge comprising:
- a photosensitive drum disposed at a position closer to the rear wall than to the front wall when the photosensitive member cartridge is mounted at a photosensitive member cartridge mounting position between the front wall and the rear wall;

a developing cartridge comprising:
- a developing roller facing the photosensitive drum when the developing cartridge is mounted at a developing cartridge mounting position between the front wall and the rear wall;

an exposing unit configured to emit light toward the photosensitive drum to expose the photosensitive drum, wherein the exposing unit is disposed at a position closer to the front wall than to the rear wall; and a fixing device comprising a heating roller and a pressing roller;

wherein the photosensitive member cartridge guide guides the photosensitive member cartridge from the opening of the main body toward the photosensitive member cartridge mounting position; and wherein the developing cartridge guide guides the developing cartridge from the opening of the main body toward the developing cartridge mounting position;

wherein, when the photosensitive member cartridge is at the photosensitive member cartridge mounting position, the photosensitive member cartridge is disposed at a position between the fixing device and the sheet feeding tray; and wherein, when the developing cartridge is at the developing cartridge mounting position, the developing cartridge is disposed at a position between the photosensitive member cartridge and the sheet feeding tray.

2. The image forming apparatus according to claim 1, wherein the main body further comprises:
- a pressing member that is disposed on a rear end of the developing cartridge guide; and
- a spring that is disposed below the pressing member and is configured to press the pressing member upward to press the developing cartridge upward via the pressing member.

3. The image forming apparatus according to claim 1, wherein the photosensitive member cartridge guide has:
- a first end; and
- a second end that is closer to the front wall than the first end, the second end being closer to the front wall than to the rear wall;

wherein the developing cartridge guide has:
- a third end; and
- a fourth end that is closer to the front wall than the third end, the fourth end being closer to the front wall than to the rear wall;

wherein the first end of the photosensitive member cartridge guide is closer to the rear wall than the third end of the developing cartridge guide.

4. The image forming apparatus according to claim 1, wherein the photosensitive member cartridge has a protrusion, and wherein the photosensitive member cartridge guide is configured to guide the protrusion of the photosensitive member cartridge.

5. The image forming apparatus according to claim 1, wherein the developing cartridge has a protrusion, and wherein the developing cartridge guide is configured to guide the protrusion of the developing cartridge.

6. The image forming apparatus according to claim 1, wherein the photosensitive member cartridge guide extends from the opening on the front wall toward the rear wall, wherein the developing cartridge guide extends from the opening on the front wall toward the rear wall, and wherein a rear end of the photosensitive member cartridge guide is closer to the rear wall than a rear end of the developing cartridge guide.

* * * * *